(12) United States Patent
Vailliencourt

(10) Patent No.: US 6,682,690 B2
(45) Date of Patent: Jan. 27, 2004

(54) CORE ROD POSITIONING METHOD

(75) Inventor: Dwayne G. Vailliencourt, Manchester, MI (US)

(73) Assignee: Schmalbach-Lubreca AG (DE)

( * ) Notice: Subject to any disclaimer, the term of this patent is extended or adjusted under 35 U.S.C. 154(b) by 429 days.

(21) Appl. No.: 09/775,039

(22) Filed: Feb. 1, 2001

(65) Prior Publication Data

US 2002/0101010 A1 Aug. 1, 2002

(51) Int. Cl.⁷ .......................... B29C 49/06; B29C 49/64
(52) U.S. Cl. ................. 264/537; 264/40.6; 264/328.16; 425/144; 425/526
(58) Field of Search .......................... 264/328.16, 40.6, 264/537; 425/143, 144, 552, 526

(56) References Cited

U.S. PATENT DOCUMENTS

| | | | |
|---|---|---|---|
| 3,217,360 A | 11/1965 | Mason et al. | |
| 3,221,371 A | 12/1965 | Stevens | |
| 3,309,443 A | 3/1967 | Scott, Jr. et al. | |
| 3,339,235 A | 9/1967 | Nossol | |
| 3,470,282 A | 9/1969 | Scalora | |
| 3,535,739 A | 10/1970 | Mehnert | |
| 3,697,632 A | 10/1972 | Tenner | |
| 3,754,851 A | 8/1973 | Reilly et al. | |
| 3,781,395 A | 12/1973 | Uhlig | |
| 3,933,417 A | 1/1976 | Reilly et al. | |
| 4,171,195 A | 10/1979 | Klein et al. | |
| 4,382,766 A | 5/1983 | Feuerherm | |
| 5,498,150 A | * 3/1996 | Check | 425/526 |
| 6,168,740 B1 | * 1/2001 | Koch et al. | 264/237 |
| 6,171,540 B1 | * 1/2001 | Ibaragi | 264/328.1 |
| 6,223,541 B1 | * 5/2001 | Farrag | 62/62 |
| 6,276,922 B1 | * 8/2001 | Huston et al. | 425/547 |

* cited by examiner

Primary Examiner—Michael Colaianni
Assistant Examiner—Monica A Fontaine
(74) Attorney, Agent, or Firm—Harness, Dickey & Pierce, P.L.C.

(57) ABSTRACT

A core rod positioning device and method for controlling the distribution of material in products formed by injection blow molding machines is provided. The core rod positioning device has a sleeve having an outer surface defining an interior surface of an article molded using the core rod assembly. The sleeve also has an interior surface and a mandrel is located within the sleeve. Portions of the mandrel define a first passageway therethrough and which terminates at a port located in the exterior surface of the mandrel. The exterior surface of the mandrel cooperates with the interior surface of the sleeve thereby defining a second passageway between the sleeve and the mandrel. An adjustment mechanism is operably coupled to the mandrel allowing the mandrel to be adjusted laterally relative to the sleeve.

12 Claims, 5 Drawing Sheets

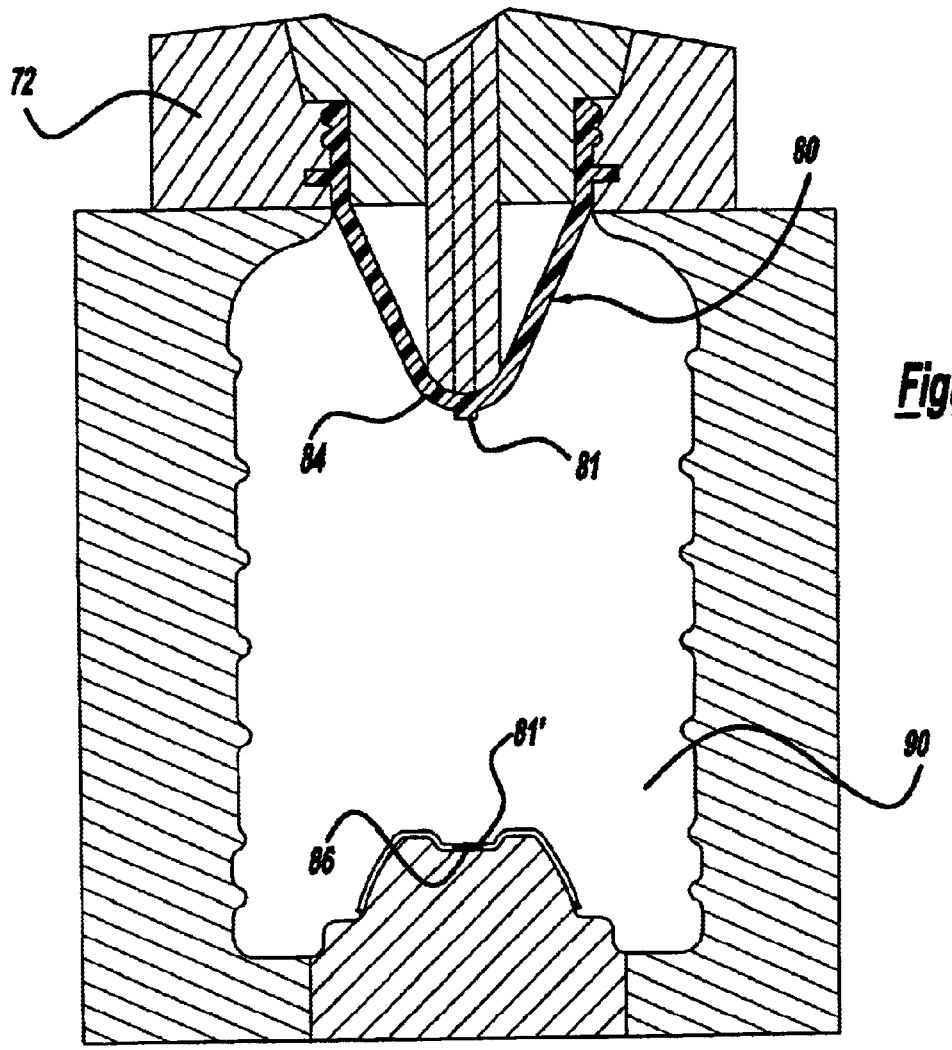

CORE ROD POSITIONING METHOD

BACKGROUND

1. Technical Field of the Invention

This invention generally relates to injection blow molding machines and, more particularly, to a method for controlling the distribution of material in products formed by injection blow molding machines.

2. Discussion

A traditional injection blow molding machine has several stations. These stations include an injection molding station, a conditioning station, a blow molding station, and a take out station. A rotating mechanism or table transfers the plastic product to and through the various stations of the injection blow molding machine. Product formation, however, begins in the injection molding station where a plastic parison is formed.

In the injection molding station, a cavity mold is brought into contact with a neck mold. Then, a core rod assembly is inserted into the cavity mold through the neck mold. Next, an injection nozzle is brought into contact with the cavity mold and molten resin is then forced into the cavity defined by the cavity molds, thereby forming a parison. After the parison has been formed, the neck mold and the core rod assembly are moved away from the injection molding station. The parison is still contained within the neck mold and the rotating mechanism then rotates the neck mold to the next station.

In the conditioning station, the rotating mechanism positions the neck mold containing the parison above one or more heating cylinders. Then, one or more heating cores are inserted through the neck mold into the parison as heating cylinders are elevated to thereby surround the parison. The parison is then heated to a predetermined temperature. After conditioning, the heating cores and the heating cylinders are removed from the station. The rotating mechanism then rotates the parison to the next station.

In the blow molding station, blow molds are closed around the parison. Next, a blow core assembly engages the neck mold and a stretch rod is inserted into the parison thereby stretching the parison in an axial direction. In a synchronized movement, the parison is supplied with blown air so that the parison expands within the blow mold to form a hollow molded container. After the container is formed, the blow molds and the blowing core assembly are moved away from the station and the rotating mechanism rotates the neck mold carrying the molded plastic container to the next station.

In the take out station, the molded container is removed from the neck mold in a conventional manner such as expanding neck mold halves to release the container and/or through other means. After the molded container has been removed, the rotating mechanism then rotates the neck mold to the cavity molding stage where the process is repeated.

Proper material distribution is critical throughout this process. The quality of the molded container and its ability to retain a product placed within it depends on a proper distribution of the plastic forming the parison as it is transformed into the molded container. Therefore, a need exists to be able to control the distribution of material throughout the injection blow molding process.

Additionally, a need exists for controlling material distribution without having to significantly modify existing machine tooling.

SUMMARY OF THE INVENTION

In accordance with a preferred embodiment of the present invention, a core rod positioning device and method is provided. The core rod positioning device and method permits material distribution in the resultant container to be manipulated or fine tuned. This is achieved by slightly altering the conditioning of the preforms, the alteration being specific for each container mold cavity.

The core rod positioning device comprises a sleeve having an outer surface that defines the interior surface of the preform being molded using that core rod assembly. Within the sleeve is a mandrel. Portions of the mandrel define a first passageway therethrough and which terminates at a port located in the exterior surface of the mandrel. The exterior surface of the mandrel also cooperates with an interior surface of the sleeve thereby defining a second passageway located between the sleeve and the mandrel. Additionally, an adjustment mechanism is operably coupled to the mandrel allowing the port of the mandrel to be adjusted relative to the sleeve.

About the sleeve is located a cavity mold. Between the two, the preform is formed. As the preform is formed it is possible for the material of the preform to be unevenly cooled. As a result, during blow molding, the preform may stretch unevenly thereby resulting in a poor or unacceptable container.

A fluid coolant is circulated through the first and then the second passageway of the mandrel to control the temperature of the material between the sleeve and the cavity mold. When the mandrel is centered within the sleeve, generally even cooling is affected on the preform. If the mandrel is shifted relative to the sleeve, additional cooling can be directed to specific areas of the preform. As a result, material distribution can be controlled by positioning the mandrel port thereby cooling a specific portion of the preform and affecting how the preform stretches in the blow molding station.

As evident from the above, with the core rod positioning device being located within the core rod assembly, there is no need to significantly modify the other existing machine tooling.

The various advantages of the present invention will become apparent to one skilled in the art upon reading the following specification and by reference to the following drawings.

BRIEF DESCRIPTION OF THE DRAWINGS

FIG. 5c is a diagrammatic side view of a preform and resultant product having a corrected material distribution.

DETAILED DESCRIPTION OF THE PREFERRED EMBODIMENT

The following description of the preferred embodiment is merely exemplary in nature and is in no way intended to limit the invention or its application or uses.

Figure 1:
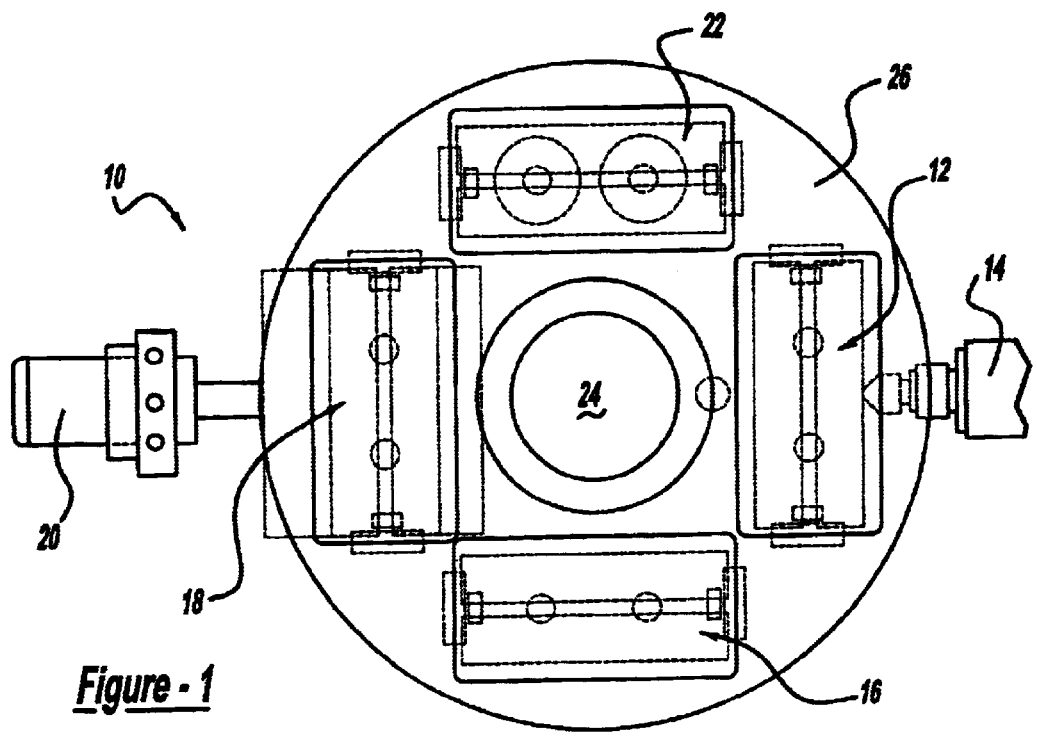
FIG. 1 is a schematic view of a four station injection blow molding machine.

Referring to FIG. 1, an injection blow molding machine 10 is schematically shown. The injection blow molding machine 10 has four stations. The first station is an injection molding station 12. Injection molding station 12 also has an injection device 14 of conventional construction which provides the molten plastic resin used to form a parison. The second station is a conditioning station 16. The third station is a blow molding station 18. The blow molding station 18 also has an actuator 20, hydraulic, or other, which closes the mold halves around the parison prior to the blowing and stretching of the parison. The fourth station is a take out station 22. The injection blow molding machine 10 has a drive mechanism 24 which causes rotation of a rotary table 26 through each station.

Figure 2:
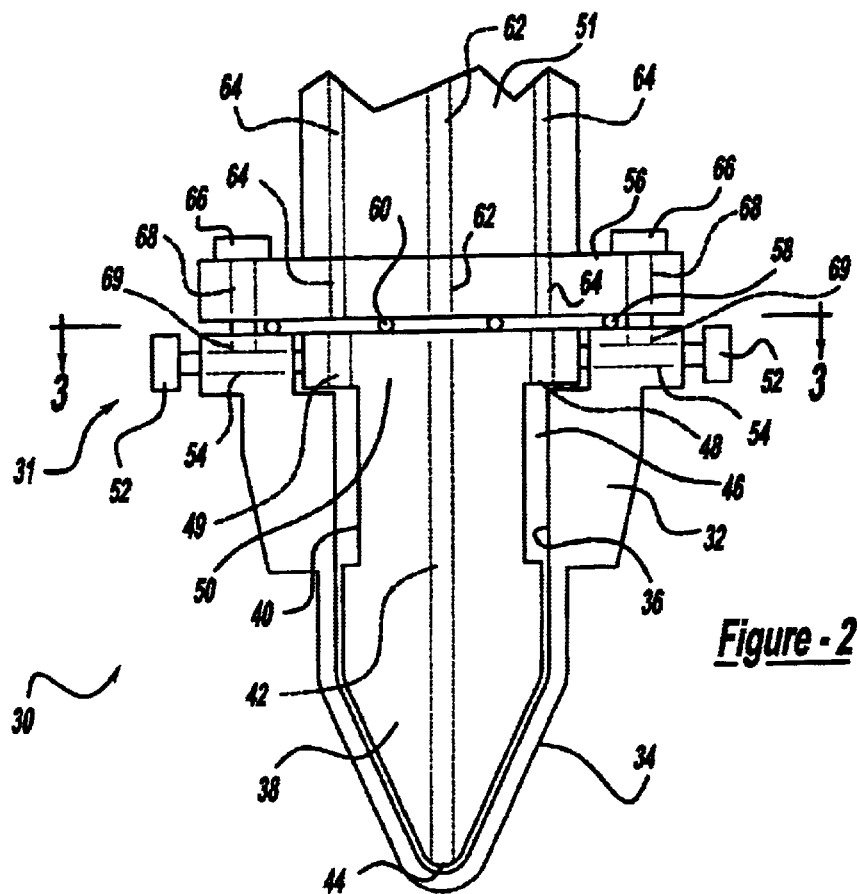
FIG. 2 is a cross-sectional side view of a preferred embodiment of a core rod positioning device.

Referring to FIG. 2, a core rod assembly 30 including a mandrel positioning mechanism (hereinafter positioning mechanism 31) is shown in accordance with a preferred embodiment of the present invention. The core rod assembly 30 comprises several components including a sleeve 32 and a mandrel 38. The sleeve 32 has an outer surface 34 which defines an interior surface of an injection molded article. The mandrel 38 is located within the sleeve 32 and has an exterior surface 40 spaced apart from an interior surface 36 of the sleeve 32.

A first passageway 42, referred to as a fluid feed passageway, is defined longitudinally through the mandrel 38 along the mandrel's central axis. The first passageway 42 terminates at a port 44 located in the exterior surface 40 of the mandrel 38 at the mandrel's tip. The exterior surface 40 of the mandrel 38 cooperates with the interior surface 36 of the sleeve 32 thereby creating a second passageway 46, referred to as a fluid return passageway. In an upper portion 50 of the mandrel 38, at least one aperture 48 is provided to allow the second passageway 46 to continue through the upper portion of the mandrel 38 as an internal passageway designated at 49.

Adjustment of the mandrel 38, and more specifically the location of the port 44 in the tip of the mandrel 38, relative to the sleeve 32 is accomplished through the positioning mechanism 31 which comprises a series of adjustment screws 52 provided through threaded bores 54 located in sleeve 32. The adjustment screws 52 contact the upper portion 50 of the mandrel 38. The adjustment screws 52, as further described below, allow the position of the port 44 to be adjusted relative to the sleeve 32 and allows coolant flow to be directed more to one side of the sleeve 32. Retaining the mandrel 38 within the sleeve 32 is a flange or cover 56 positioned over the sleeve 32 and the mandrel 38.

O-rings 58 and 60 are respectively positioned between the cover 56 and the sleeve 32 and between the cover 56 and the mandrel 38. The O-rings 58 and 60 define flow cavities and permit fluid flow into the first passageway 42 and out of the second passageway 46, even if these passageways 42 and 46 are not precisely aligned with coolant infeed 62 and coolant outfeed 64 passageways defined in a shaft 51 coupled to the flange 56 and through the flange 56 itself.

Although an O-ring has been depicted in a preferred embodiment, it is specifically contemplated that other sealing materials could be incorporated in additional embodiments of this invention. These sealing materials include, but are not limited to, gaskets and other commonly known types of sealing materials.

The flange 56 is secured with fasteners 66 to the sleeve 32. The fasteners 66 are preferably screws received in bores 68 in the flange 56 and threaded bores 69 in the sleeve 32. Although threaded fasteners 66 have been depicted in this preferred embodiment, it is specifically contemplated that other types of fasteners can be used with equal success in other embodiments of this invention. These include, but are not limited to, clamping devices.

Figure 3:
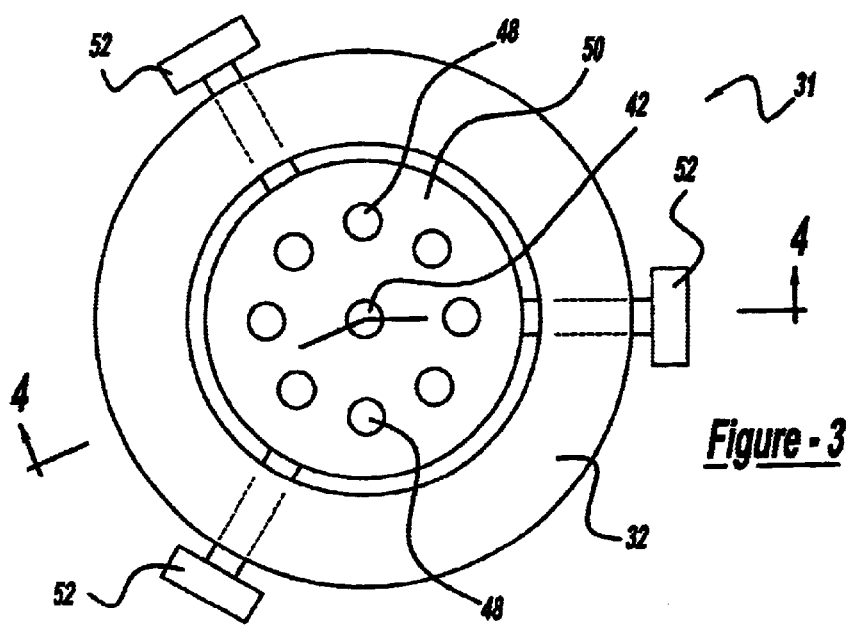
FIG. 3 is a top cross-sectional view of the core rod positioning device taken along the line 3—3 of FIG. 2.

Referring to FIG. 3, a top cross-sectional view of the core rod positioning mechanism 31 is shown in accordance with a preferred embodiment of the invention. In this figure, sleeve 32 is shown along with the upper portion 50 of the mandrel 38. In this view, three adjustment screws 52 are seen as being positioned equidistantly around the sleeve 32 (approximately 120° apart). The ends of the adjustment screws 52 contact the upper portion 50 of the mandrel and the position of the mandrel 38, and therefore the flow about the mandrel 38, can be adjusted by adjusting the relative position of the ends of the adjustment screws 52.

Although threaded screws 52 are depicted in this preferred embodiment, it is specifically contemplated that other types of adjustment mechanisms can be used with equal success. These adjustment mechanisms include, but are not limited to; other fasteners or motor controlled positioning members or mechanisms.

Figure 4:
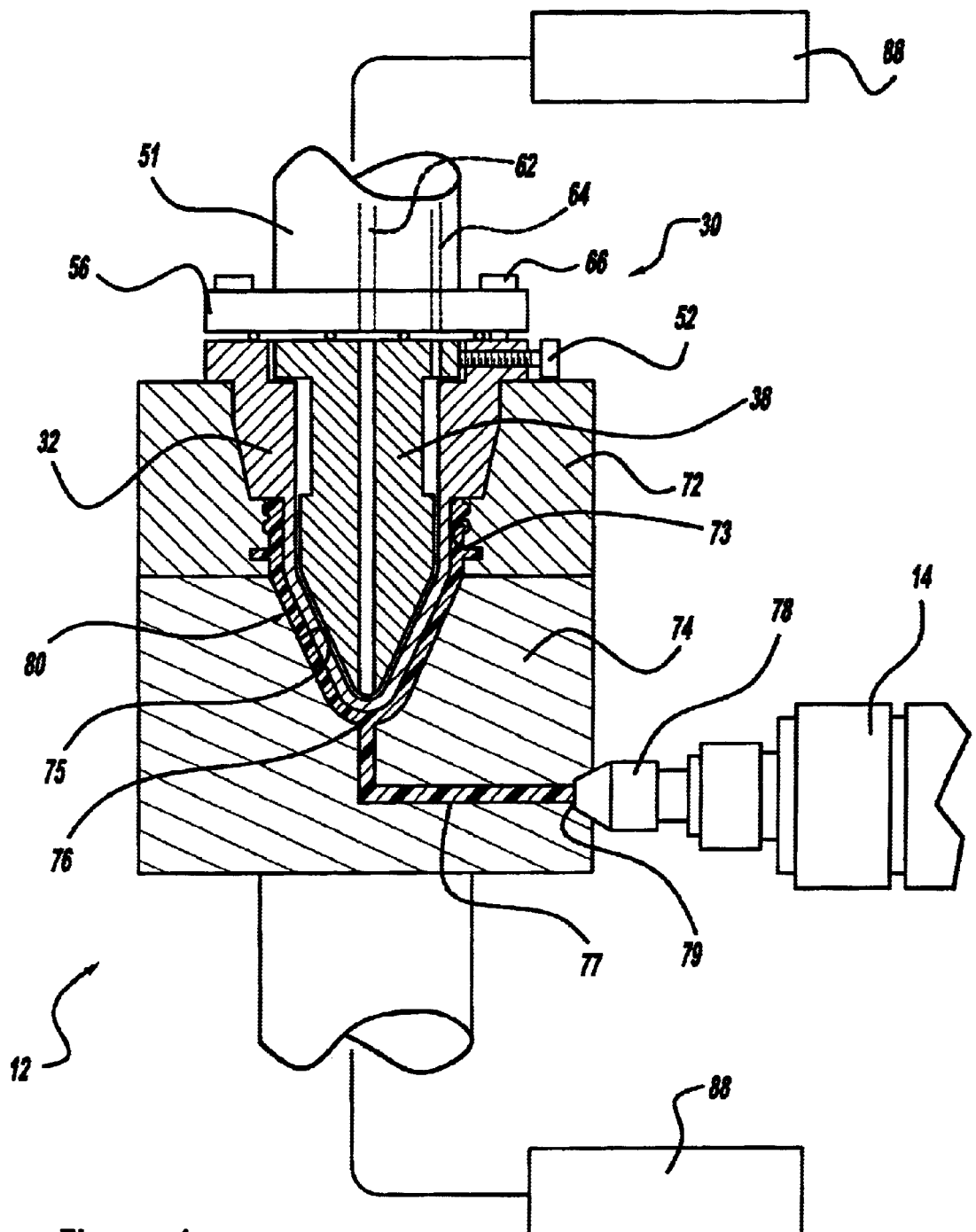
FIG. 4 is a side cross-sectional view of the core rod positioning device taken along the line 4—4 of FIG. 3.

Referring to FIG. 4, a cross-sectional view of the core rod assembly 30 is shown. The core rod assembly 30 is inserted into a neck mold 72, a portion of which includes surfaces 73 which define the thread finish of a resultant preform 80. Preform cavity mold 74 is brought into position where its upper face contacts a lower face of the neck mold 72. The cavity surfaces 73 and 75 of the neck mold 72 and the cavity mold 74 thus cooperate with the exterior surface of the sleeve 32 to define a preform cavity. This preform cavity is illustrated in FIG. 4 as having a preform 80 injection molded therein.

To form the preform 80, the preform cavity mold 74 has a flow channel 77 and gate 76 formed therein. An injection nozzle 78 of the injection device 14 is brought in contact with entrance end 79 of the channel 77 and molten plastic is injected from the injection nozzle 78, through the channel 77 and gate 76, into the preform cavity. This forms the preform 80. Hydraulic actuators 88 control the positioning, advancement and retraction, of the core rod assembly 30 and the preform cavity mold 74 relative to the neck mold 72. The neck mold 72 is carried by or otherwise attached to the table 26 for rotation therewith. The neck mold 72 retains the parison as the parison is rotated through each station.

Figure 5B:
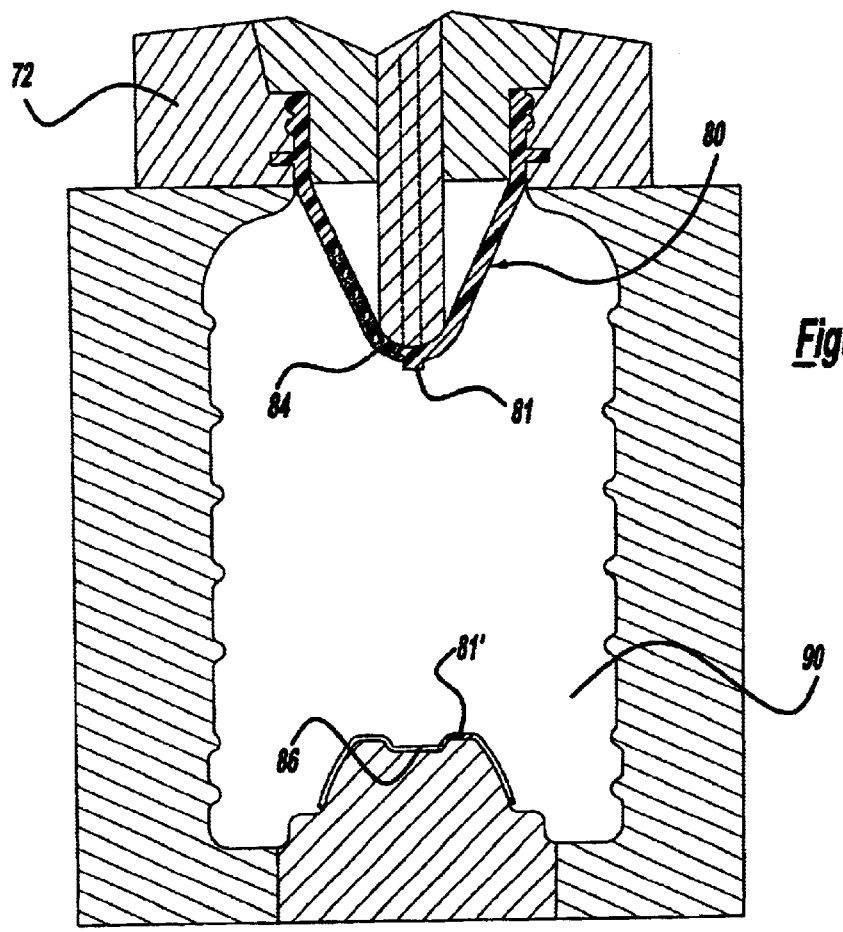
FIG. 5b is a diagrammatic side view of a preform and resultant product having an uncorrected material distribution.

After injection molding, the preform 80 is rotated to the conditioning station 16 and then to the blow molding station 18. In the blow molding station 18, the preform 80 is stretched and inflated to form a container. During this process, temperature variations in the end and sidewall of the preform 80 can cause unequal stretching of the plastic material, producing thin spots in the container and off-centering the gate area remnant 81 of the preform 80. As seen in FIG. 5b, the gate area remnant 81', after stretching, has shifted to the right in the Figure instead of being located in the center 86 of the base of the container 90. This can occur because of a hot spot 84 or other temperature variation in the preform 80 or because of other considerations and variations in the blow molding process. Additionally, in a given machine there can be variations from one blow molding cavity to another.

During operation of the machine 10, the material distribution or positioning of the remnant 81 can be controlled using the present invention. Using water, or another suitable coolant fluid, the temperature of the preform material at a specific location can be adjusted and controlled in the following manner.

Referring back to FIG. 2, coolant fluid is introduced into passageway 42 and is controlled by a controller (not shown). After the fluid flows through the passageway 42, it contacts the interior surface 36 of the sleeve 32 once it exits through the port 44. The temperature of the fluid is lower than the temperature of the preform resin. Therefore, when the fluid contacts the interior surface 36 of the sleeve 32, the temperature of the sleeve 32 in the area of fluid contact is lowered. This results in the temperature of the preform 80 in the corresponding area also being lowered. Fluid flows out of the core rod assembly 30 using fluid return passageway 46.

Figure 5A:
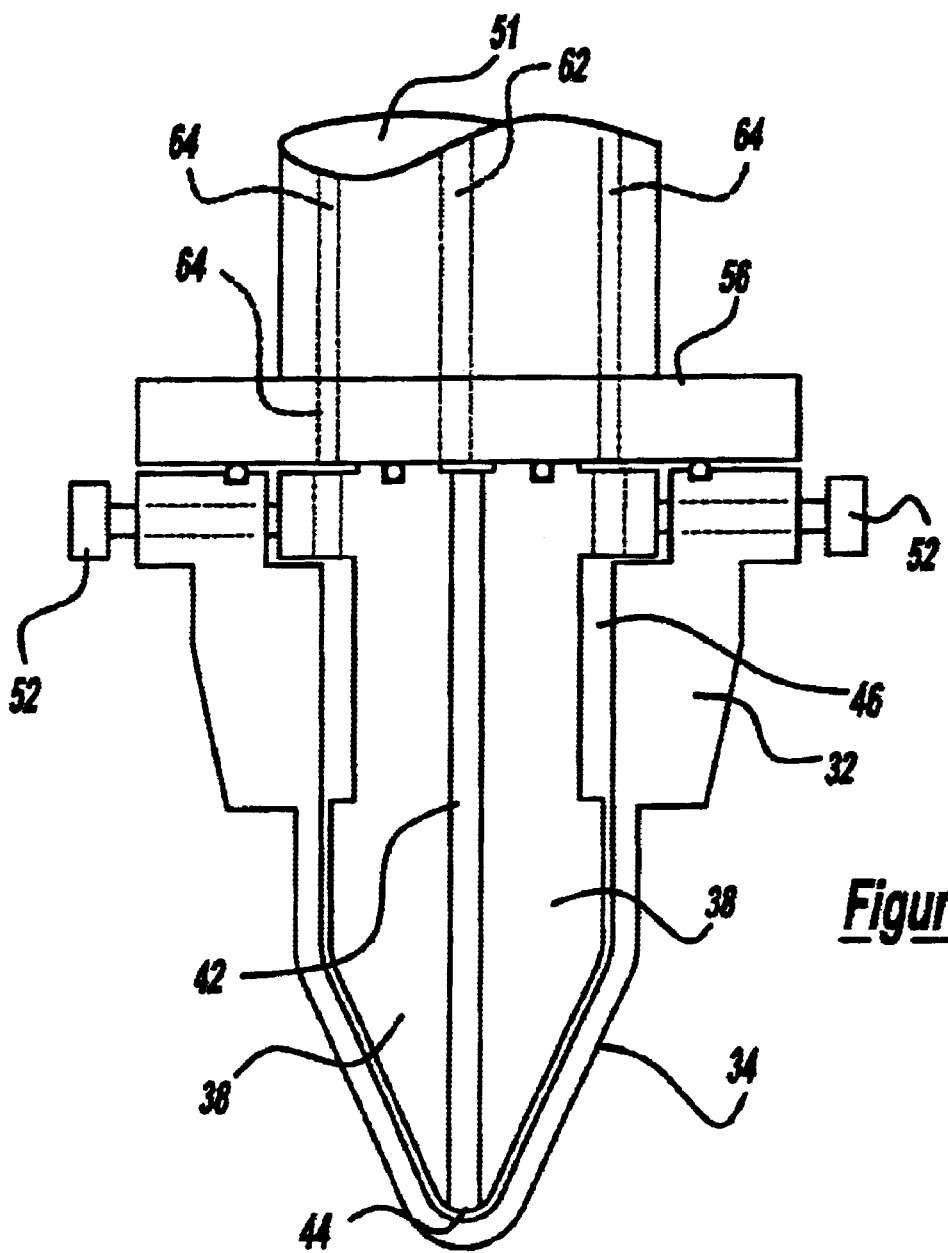
FIG. 5a is a cross-sectional side view of the core rod positioning device with the mandrel shifted to one side.

By individually manipulating the adjustment screws 52, the positioning of the mandrel 38 can be adjusted in a radial direction relative to a longitudinal axis of the core rod assembly 30 as seen in FIG. 5a. This repositioning or fine tuning, creates a change in coolant flow providing greater coolant flow along one side of the mandrel 38 and sleeve 34. Shifting the mandrel 38 to one side creates a flow restriction on that side between the mandrel 38 and the sleeve 34. Correspondingly, greater flow is enabled on the opposing side. In this manner, "thin spots" can be treated as they develop. For example, mandrel 38, FIG. 5a can be laterally adjusted away from a hot area 84, providing greater coolant flow adjacent to the hot area 84 thereby cooling the hot area 84. As a result, less stretch about the hot spot occurs and the remnant 81' will shift towards the center portion 86 of the base of the container 90. In FIG. 5c, the present invention has been used to cool the hot area 84 causing the remnant 81' to be brought back to the preferred center position 86. Once the proper position of the port 44 has been determined for a given cavity mold the position of adjustment screws 52, and the mandrel 38 and port 44 now, in their proper positions, may be locked or otherwise secured in position. Such mechanisms for locking the position of the screws 52 may include mechanical means or just the fit of the screws 52 within their respective bores.

The foregoing discussion discloses and describes a preferred embodiment of the invention. One skilled in the art will readily recognize from such discussion, and from the accompanying drawings and claims, that various changes, modifications, and variations can be made therein without departure from the true spirit and fair scope of the invention as defined in the following claims.

I claim:

1. A method of using a core rod assembly of an injection molding station of an injection blow molding machine, the method comprising the steps of:

providing a sleeve having an outer surface defining an interior surface of an article cavity molded on the core rod assembly, the sleeve also having an interior surface;

positioning a mandrel within the sleeve, portions of the mandrel defining a first passageway in the mandrel, the mandrel also having an exterior surface and the first passageway terminating at a port in the exterior surface, the exterior surface cooperating with the interior surface of the sleeve to define a second passageway between the sleeve and the mandrel;

operatively coupling an adjustment mechanism between the mandrel and the sleeve;

adjustably positioning the mandrel laterally relative to the sleeve via the adjustment mechanism to provide increased coolant flow to one side of the sleeve; and adjustably positioning the port in a radial direction relative to a longitudinal axis of the core rod assembly using the adjustment mechanism.

2. The method of claim 1 further comprising the steps of:

introducing a fluid into a fluid feed passageway, the fluid feed passageway being the first passageway; and removing the fluid using a fluid return passageway, the fluid return passageway being the second passageway.

3. The method of claim 1 further comprising the step of:

adjustably positioning said mandrel laterally relative to the sleeve by manipulating a plurality of radially oriented adjustment screws.

4. The method of claim 1 further comprising the step of:

operatively locking the adjustment mechanism in position.

5. The method of claim 1 further comprising the step of:

operatively coupling an actuation member to the sleeve.

6. The method of claim 5 further comprising the step of:

positioning at least one fluid tight seal in between the actuation member and the sleeve, wherein the first passageway and the second passageway have separate and distinct paths of fluid communication through the actuation member.

7. A method of using a core rod assembly of an injection molding station of an injection blow molding machine, the method comprising the steps of:

providing a sleeve having an outer surface defining an interior surface of an article cavity molded on the core rod assembly, the sleeve also having an interior surface;

positioning a mandrel within the sleeve, portions of the mandrel defining a first passageway in the mandrel, the mandrel also having an exterior surface and the first passageway terminating at a port in the exterior surface, the exterior surface cooperating with the interior surface of the sleeve to define a second passageway between the sleeve and the mandrel;

operatively coupling an adjustment mechanism between the mandrel and the sleeve;

adjustably positioning the mandrel laterally relative to the sleeve via the adjustment mechanism to provide increased coolant flow to one side of the sleeve; and positioning at least one fluid tight seal between an actuation member and the sleeve, wherein the first passageway and the second passageway have separate and distinct paths of fluid communication through the actuation member.

8. The method of claim 7 further comprising the step of:

adjustably positioning the port in a radial direction relative to a longitudinal axis of the core rod assembly using the adjustment mechanism.

9. The method of claim 7 further comprising the steps of:

introducing a fluid into a fluid feed passageway, the fluid feed passageway being the first passageway; and removing the fluid using a fluid return passageway, the fluid return passageway being the second passageway.

10. The method of claim 7 further comprising the step of:

adjustably positioning said mandrel laterally relative to the sleeve by manipulating a plurality of radially oriented adjustment screws.

11. The method of claim 7 further comprising the step of:

operatively locking the adjustment mechanism in position.

12. The method of claim 7 further comprising the step of:

operatively coupling the actuation member to the sleeve.

* * * * *

UNITED STATES PATENT AND TRADEMARK OFFICE
CERTIFICATE OF CORRECTION

PATENT NO.     : 6,682,690 B2
DATED          : January 27, 2004
INVENTOR(S)    : Dwayne G. Vailliencourt It is certified that error appears in the above-identified patent and that said Letters Patent is hereby corrected as shown below:

<u>Title page,</u>
Item [73], Assignee, "Schmalbach-Lubreca AG" should be -- Schmalbach-Lubeca AG --.

Signed and Sealed this

Fourth Day of January, 2005

JON W. DUDAS
*Director of the United States Patent and Trademark Office*